United States Patent [19]

Sykes et al.

[11] Patent Number: 5,131,696
[45] Date of Patent: Jul. 21, 1992

[54] TUBE JOINT FOR ANNULAR CORRUGATED TUBING

[75] Inventors: Robert C. Sykes, Burlington; Patsy A. Coppola, III, Bedford; Paul R. Belkus, Whitinsville, all of Mass.

[73] Assignee: Gas Research Institute, Chicago, Ill.

[21] Appl. No.: 707,459

[22] Filed: May 30, 1991

[51] Int. Cl.⁵ .................. F16L 21/06; F16L 13/14
[52] U.S. Cl. ................................. 285/382; 285/323; 285/903
[58] Field of Search ............ 285/322, 323, 382, 382.1, 285/903

[56] References Cited

U.S. PATENT DOCUMENTS

| | | | |
|---|---|---|---|
| 3,079,182 | 2/1963 | Appleton | 285/382 X |
| 3,514,134 | 5/1970 | Shurtleff et al. | 285/382 X |
| 3,754,781 | 8/1973 | Conroy | 285/382 X |
| 5,028,078 | 7/1991 | Schwarz et al. | 285/12 |

FOREIGN PATENT DOCUMENTS

| | | | |
|---|---|---|---|
| 0133341 | 2/1985 | European Pat. Off. | 285/382 |
| 1352445 | 5/1974 | United Kingdom | 285/906 |
| 2125501 | 3/1984 | United Kingdom | 285/903 |

Primary Examiner—Michael F. Trettel
Attorney, Agent, or Firm—Iandiorio & Dingman

[57] ABSTRACT

A tube joint for annular corrugated tubing includes a body having a sleeve for receiving the end of an annular corrugated tube; at least one circumferential raised lobe on the sleeve for engaging an annular corrugation of the tube; and a collar for engaging the body and including a swaging section having a first camming surface for compressing the lobe radially inwardly to engage a corrugation of the tube.

20 Claims, 3 Drawing Sheets

TUBE JOINT FOR ANNULAR CORRUGATED TUBING

FIELD OF INVENTION

This invention relates to a tube joint for annular corrugated tubing, and more particularly to such a tube joint which radially and axially sealingly secures the tube.

BACKGROUND OF INVENTION

Annular corrugated tubing is extremely desirable because it is strong and semi-rigid yet extremely bendable, facilitating ease of installation. Connectors for such tubing include a variety of different types. In one type of connector there are a large number of parts including a body, a collar, a split retainer ring and a fiber washer. The fiber washer is fixed in the base of the sleeve in the body which receives the end of the corrugated tube. The end of the tube must be properly finished to seal against the washer. The split retainer halves are cumbersome to install and are expensive to make. They include a plurality of recesses sized and spaced to snugly grip the corrugations. And the retainer halves must be placed a specified number of corrugations back from the end of the tube (typically three) so that when the collar is tightened on the body the axial collapse of the three corrugations form a proper sealing force against the washer. In another type of connector which also uses a large number of parts, the end of the tube must be finished and flared. A special insert is provided to seal against the flared surface and a split retainer ring must be employed to fit in the groove of a corrugation, rise above the peak of the corrugations, and be engaged by the collar as it is drawn up on the body to press the flared surface against the insert and effect the seal. These types of connectors for annular corrugated tubing are appealing in many ways for use in natural gas home heating systems and other systems. In such an environment the concern for safety, reliability and ease of installation is increased.

SUMMARY OF INVENTION

It is therefore an object of this invention to provide an improved tube joint for annular corrugated tubing.

It is a further object of this invention to provide such an improved tube joint which has a minimum of parts, is less expensive, and is easier to install.

It is a further object of this invention to provide such an improved tube joint which remains mechanically locked to the tube and sealingly engaged even if the collar is loosened or removed.

It is a further object of this invention to provide such an improved tube joint which is tamper-proof and cannot be readily reassembled after the tube and joint are disassembled.

It is a further object of this invention to provide such an improved tube joint which cannot be overtightened and crush the tube.

It is a further object of this invention to provide such an improved tube joint which automatically sets the insertion depth of the tube into the joint.

It is a further object of this invention to provide such an improved tube joint which requires no special finishing of the tube or special tools for installation.

It is a further object of this invention to provide such an improved tube joint which is entirely and permanently self-swaging.

It is a further object of this invention to provide such an improved tube joint which is resistant to loosening.

The invention results from the realization that a truly simple yet effective and reliable joint for annular corrugated tubing can be achieved with a body having a sleeve for receiving the end of an annular tube which sleeve includes one or more circumferential raised lobes that are compressed into the grooves of the corrugations by the swaging surface of the collar as it is secured to the body.

This invention features a tube joint for annular corrugated tubing. There is a body including a sleeve for receiving the end of an annular corrugated tube. There is at least one circumferential raised lobe on the sleeve for engaging an annular corrugation of the tube. A collar engages the body and includes a swaging section having a first camming surface for compressing each lobe radially inwardly to engage a corrugation of the tube.

In a preferred embodiment the sleeve is elongated and receives a plurality of corrugations of the tube. There may be a plurality of spaced raised lobes on the sleeve. The plurality of lobes may have the same pitch as the corrugation of the tube. The sleeve may include means for defining the limit of the insertion of the tube into the sleeve. The means for defining may align the lobes with the grooves of the corrugations and the means for defining may be implemented by means of a shoulder within the sleeve.

Each of the lobes may be on the outside of the sleeve. There may be one lobe proximate the distal end of the sleeve and the first camming surface may be proximate the distal end of the collar. The first camming surface may swage radially inwardly and crimp axially the lobe proximate the distal end of the sleeve.

The joint may further include means for securing the collar and body. The means for securing may include means for drawing the collar axially along the body to compress the sleeve. The means for securing may include complementary thread means on the collar and on the body. The swaging surface may include a second camming surface radially beyond the first camming surface. There may be a plurality of lobes with one of the lobes proximate the distal end of the sleeve being compressed by the first camming surface, and all of the lobes being compressed by a second camming surface. The joint may further include means for limiting the compression of the sleeve by the swaging section.

DISCLOSURE OF PREFERRED EMBODIMENT

Other objects, features and advantages will occur to those skilled in the art from the following description of a preferred embodiment and the accompanying drawings, in which.

Figure 1:
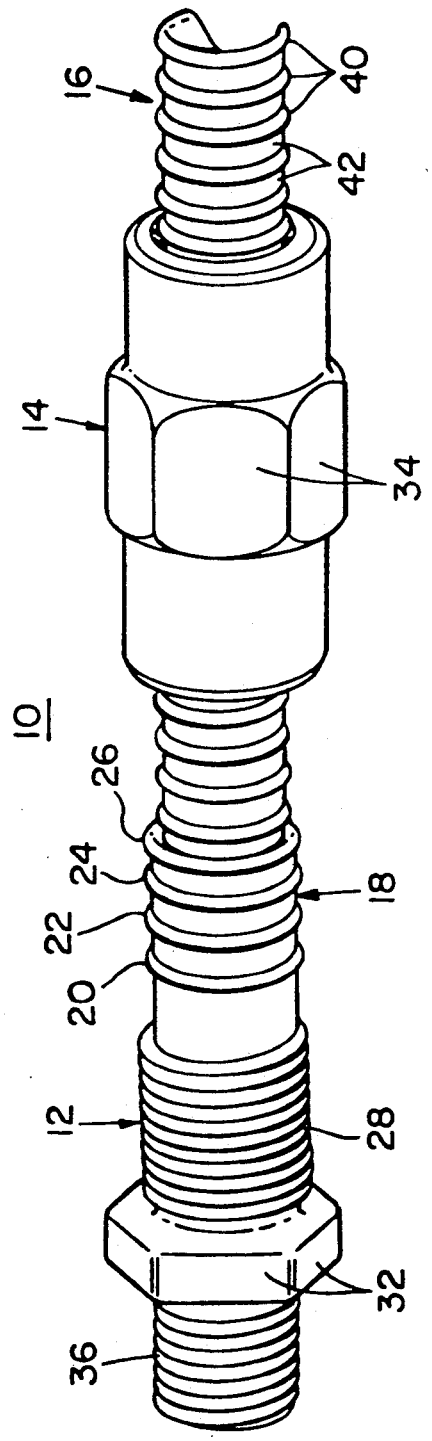
FIG. 1 is a three-dimensional view of a joint according to this invention with the collar poised for engaging the body of the joint into which the tubing has already been inserted.

This invention may be accomplished in a tube joint having a body including a sleeve for receiving the end of an annular corrugated tube. The term tube is used throughout this specification and claims in the broadest sense: it is meant to include tubing, pipes and all types of conduits. There is at least one circumferential raised lobe on the sleeve for engaging the annular corrugations of the tube. Typically there is a lobe at the distal end of the sleeve and one or more additional lobes spaced along the sleeve at a pitch commensurate with that of the tube corrugations. A collar engages the body and includes a swaging section which has a camming surface for compressing each of the lobes radially inwardly to engage a corrugation of the tube. In this manner each of the lobes is compressed inwardly into a groove of the corrugations of the tube. The collar may be rammed, tapped, or secured or drawn up in any other way. Preferably threads on the collar engage with threads on the body and a set of hex flats are provided on each part so that they may be threaded together and drawn up by means of conventional wrenches. The employment of only two parts with conventional wrench installation makes the tube joint of this invention less expensive to manufacture and much easier to install. Another camming surface acts on only the lobe at the distal end of the sleeve. This camming surface has a smaller radius than the other camming surface: that is, the other camming surface extends radially beyond this camming surface. This camming surface, then, compresses even further, radially, inwardly the lobe on the distal end and also compresses that lobe slightly axially to effect a crimping. This crimping mechanically locks the tube to the body of the joint so that even if the collar is backed off or completely removed, the tube remains locked to the body mechanically and a seal is still maintained. In addition, since the crimp prevents the tube from being easily removed, the joint is tamper-proof.

There is a stop or limiting shoulder on the outside of the body which engages with the collar and prevents the collar from being overtightened beyond what is necessary to operate the two camming surfaces of the swaging section. This prevents overtightening and crushing of the sleeve and possibly even the tubing. A shoulder inside of the sleeve on the body sets the insertion depth of the tube into the joint so that it cannot be inserted too far and there is a clear indication of when it has been inserted completely, properly. This shoulder automatically aligns the grooves with the lobes because when this tube is cut it is naturally cut in the grooves, not on the peaks, by the use of a conventional cutter-wheel tube cutter device. There is no special finishing required for the tube, nor are there any special tools required for the installation, and the entire assembly is entirely and permanently self-swaging by the action of the camming surfaces of the swaging section. Further, the compression of the sleeve, which in turn slightly compresses the tube, results in a persistent torque which resists the loosening of the collar and body threads. The lobes are preferably on the outside of the sleeve in order to avoid any clearance problems with the insertion of the corrugation, but they may be on the inside of the sleeve if this is desired.

There is shown in FIG. 1 a tube joint 10 according to this invention including a body 12 and a collar 14. A piece of annular corrugated tubing 16 is inserted into the sleeve 18 of body 12. On the outside of sleeve 18 are shown a plurality of circumferential raised lobes 20, 22, 24 and 26. Lobe 26 is at the distal end of sleeve 18. Body 12 has a threaded portion 28 which engages with threads (not shown here but see FIG. 3) on the inside of collar 14. Collar 14 and body 12 each have a hexagonal arrangement of flats 34, 32, respectively, for receiving a wrench by means of which they can be tightened and drawn up on one another. The other end of body 12 includes a threaded portion 36 for engaging a subsequent part, not important to this invention. However, threads 36 could be replaced by another joint 10 according to this invention arranged as a mirror image of the one depicted in FIG. 1.

Figure 2:
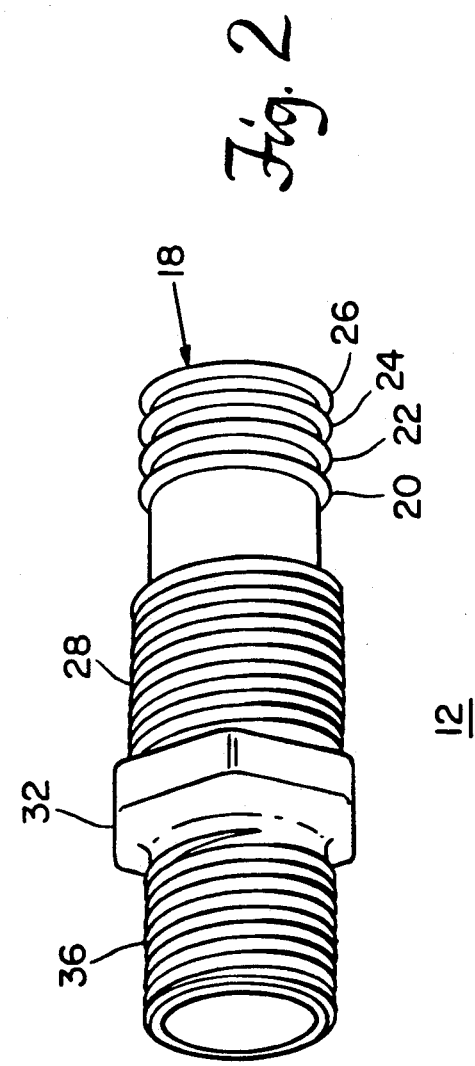
FIG. 2 is a three-dimensional view of the body of the joint shown in FIG. 1.

Corrugated tubing 16 includes annular, not helical, corrugations comprised of a plurality of peaks 40 and grooves 42. The external construction of body 12 can be seen in greater detail in FIG. 2, where grooves 20, 22, 24 and 26 are equally spaced at the same pitch as the peaks 40 and grooves 42 of the corrugations on tubing 16.

Figure 3:
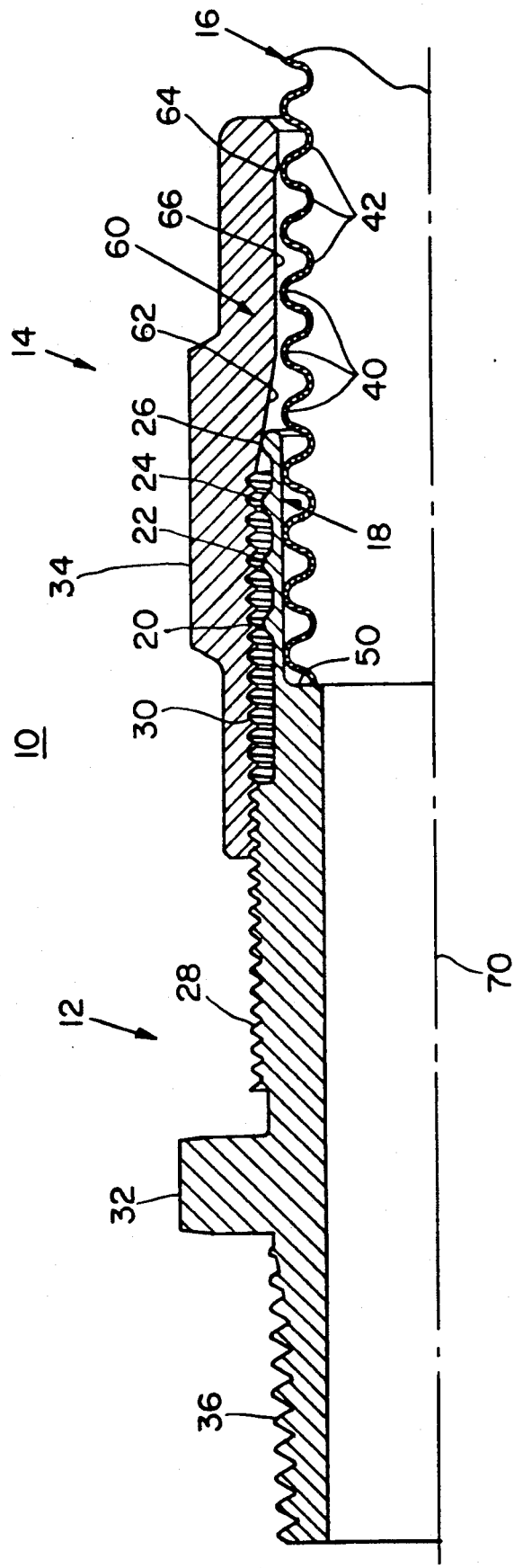
FIG. 3 is a partial side cross-sectional view circularly symmetrical about the longitudinal axis of an assembled joint with the corrugated tubing inserted before the collar has been drawn up on the body.

Sleeve 18 of body 12 includes a reduced internal shoulder section 50, FIG. 3, which acts as a stop to define the insertion of corrugated tube 16 in sleeve 18. The view of FIG. 3 is circularly symmetrical about longitudinal axis 70. The threads 30 on collar 14 which engage with threads 28 are shown clearly in FIG. 3. Also shown clearly in FIG. 3 is the swaging section 60 on the inner surface of collar 14. Swaging section 60 includes two camming surfaces 62 and 64 with a flat surface 66 between them. The first camming surface 62 has a larger radius: that is, it extends radially beyond camming surface 64. Camming surface 62 compresses radially inwardly each of the lobes beginning with lobe 26 and moving sequentially through lobes 24, 22 and 20. Camming surface 64 engages only lobe 26 and compresses it further inwardly radially, and also drives it axially downwardly toward shoulder 50 at the base of sleeve 18, in this way mechanically crimping sleeve 18 to tubing 16 to securely hold it in place, complete the seal and prevent withdrawal of the tube from body 12 even if collar 14 has been loosened or removed.

Figure 4:
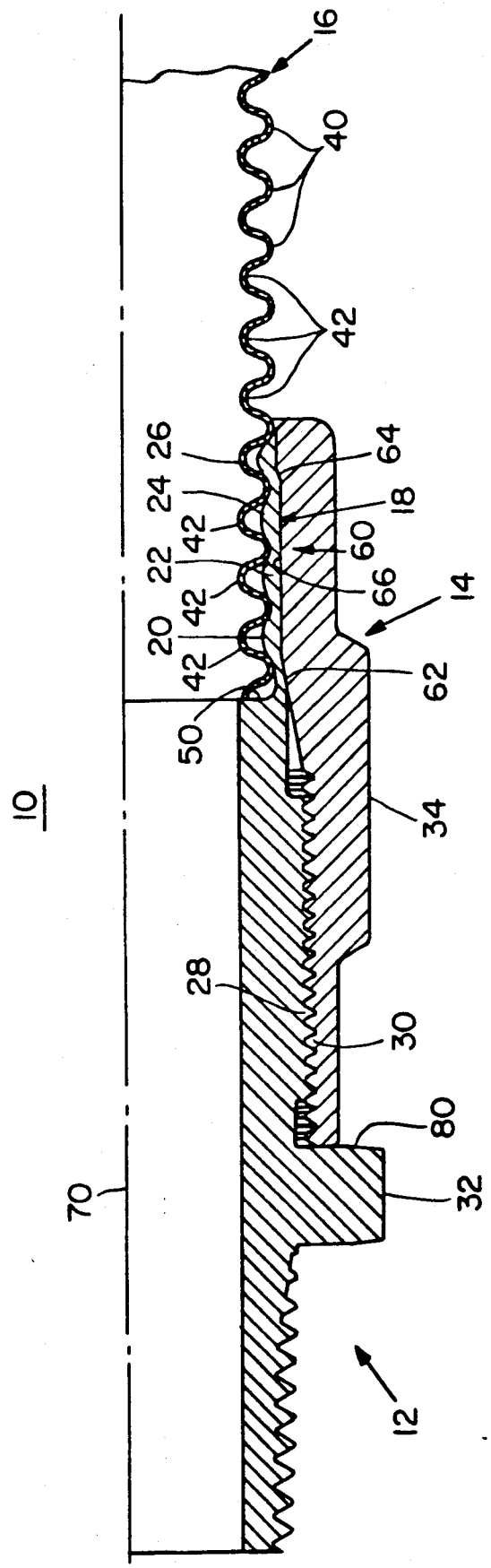
FIG. 4 is a view similar to FIG. 3 showing the joint after the collar has been drawn up on the body.

This can be seen more clearly in FIG. 4, where lobes 20, 22 and 24 have been compressed radially inwardly by camming surface 62 so that each one protrudes into a groove 42, providing a mechanical gripping, a gas-tight sealing engagement, and a torque which prevents loosening of collar 14 and body 12. Lobe 26, in addition to being compressed by camming surface 62, is further compressed by camming surface 64 and crimped over slightly, as can be seen clearly in FIG. 4, so that there is an axial crimping which mechanically secures tubing 16 against shoulder 50. Since tubing 16 is conventionally, naturally cut in the pit of a groove using a normal tube cutting device, the lobes 20-26 align properly with the grooves 42 when tube 16 abuts shoulder 50.

In an additional feature, the shoulder or stop 80 created by the raised hexagonal flats 32, acts to limit the movement of collar 14 so that the swaging surface 60 with its camming surfaces 62 and 64 cannot be compelled to overly compress sleeve 18 and possible deform it and/or crush tubing 16.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A tube joint for annular corrugated tubing comprising:
   a body including a compressively deformable sleeve for receiving the end of an annular corrugated tube;
   at least one circumferential raised lobe on said sleeve for engaging an annular corrugation of the tube; and
   a collar for engaging said body and including a swaging section having a first camming surface for compressively deforming said lobe radially, inwardly to engage a corrugation of the tube and effect a fluid-tight seal, and a first flat surface for engaging said sleeve after compressive deformation to maintain the seal.

2. The tube joint of claim 1 in which said sleeve is elongated and receives a plurality of corrugations of a tube.

3. The tube joint of claim 2 further including means for securing said collar and body.

4. The tube joint of claim 3 in which said means for securing includes means for drawing said collar axially along said body to compress said sleeve.

5. The tube joint of claim 4 in which said means for securing includes complementary thread means on said collar and body.

6. The tube joint of claim 1 in which there are a plurality of spaced said raised lobes on said sleeve.

7. The tube joint of claim 1 in which said plurality of said lobes have the same pitch as the corrugations of said tube.

8. The tube joint of claim 7 in which said sleeve includes means for defining the limit of the insertion of the tube into said sleeve.

9. The tube joint of claim 8 in which said means for defining aligns said lobes with the grooves of the corrugation.

10. The tube joint of claim 9 in which said means for defining includes a shoulder within said sleeve.

11. The tube joint of claim 1 in which each said lobe is on the outside of said sleeve.

12. The tube joint of claim 1 in which one of said at least one lobe is proximate the distal end of said sleeve and said first camming surface is proximate the distal end of said collar.

13. The tube joint of claim 12 in which said first camming surface swages radially, inwardly and crimps axially said lobe proximate the distal end of said sleeve.

14. The tube joint of claim 1 in which said swaging surface includes a second camming surface radially beyond said first camming surface.

15. The tube joint of claim 14 in which there are a plurality of said lobes, one of said lobes is proximate the distal end of said sleeve and is compressed by said first camming surface and all of said lobes are compressed by said second camming surface.

16. The tube joint of claim 14 in which said collar further includes a second flat surface between said camming surfaces for engaging said sleeve after compressive deformation to maintain the seal.

17. The tube joint of claim 1 further including means for limiting the compression of said sleeve by said swaging section.

18. A tube joint for annular corrugated tubing comprising:
   a body including a sleeve for receiving the end of an annular corrugated tube, said sleeve including a plurality of circumferential raised lobes spaced apart to align with the grooves of the corrugations at least one of said lobes being disposed proximate the distal end of said sleeve; and
   a collar for engaging said body and including a swaging section having a compression camming surface for compressing all of said lobes radially, inwardly toward the grooves of the corrugations and a crimping camming surface which compresses the lobe proximate the distal end of said sleeve radially inwardly and axially toward the base of said sleeve behind a corrugated tube crest.

19. The tube joint of claim 18 in which said sleeve includes a stop for defining the limit of insertion of the tube into said sleeve.

20. The tube joint of claim 18 in which said body includes means for limiting the compression of said sleeve by said swaging section.

* * * * *